(12) United States Patent
De Vreede et al.

(10) Patent No.: US 10,588,451 B2
(45) Date of Patent: Mar. 17, 2020

(54) CONSUMABLE RECOGNITION SYSTEM, SET OF CONSUMABLES AND BEVERAGE DISPENSER

(71) Applicant: KONINKLIJKE PHILIPS N.V., Eindhoven (NL)

(72) Inventors: Jasper De Vreede, Eindhoven (NL); Franciscus Johannes Gerardus Hakkens, Eindhoven (NL); Gerben Kooijman, Eindhoven (NL); Petrus Theodorus Jutte, Eindhoven (NL); Mark Thomas Johnson, Eindhoven (NL); Karel Johannes Adrianus Van Den Aker, Eindhoven (NL); Jan Frederik Suijver, Eindhoven (NL); Christoph Dobrusskin, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 168 days.

(21) Appl. No.: 15/102,283

(22) PCT Filed: Dec. 11, 2014

(86) PCT No.: PCT/EP2014/077347
§ 371 (c)(1),
(2) Date: Jun. 7, 2016

(87) PCT Pub. No.: WO2015/091193
PCT Pub. Date: Jun. 25, 2015

(65) Prior Publication Data
US 2016/0309953 A1 Oct. 27, 2016

(30) Foreign Application Priority Data
Dec. 20, 2013 (EP) .................................... 13198807

(51) Int. Cl.
*A47J 31/44* (2006.01)
*A47J 31/36* (2006.01)
(Continued)

(52) U.S. Cl.
CPC ....... *A47J 31/4492* (2013.01); *A47J 31/3623* (2013.01); *A47J 31/3676* (2013.01);
(Continued)

(58) Field of Classification Search
CPC ... A47J 31/4492; A47J 31/3676; A47J 31/002
(Continued)

(56) References Cited

U.S. PATENT DOCUMENTS 7,461,584 B2 12/2008 Blanc
8,495,950 B2 7/2013 Fedele et al.
(Continued)

FOREIGN PATENT DOCUMENTS

CA 2855568 A1 5/2013
CN 101630359 A 1/2010
(Continued)

OTHER PUBLICATIONS

Liang Mei, Patrik Lundin, Mikkel Brydegaard, Shuying Gong, Desong Tang, Gabriel Somesfalean, Sailinghe, and Sune Svanberg, "Tea classifications and quality assessment using laser-induced fluorescence and chemometric evaluation", Applied Optics, vol. 51, No. 7, Mar. 1, 2012, pp. 803-811.
(Continued)

*Primary Examiner* — Reginald Alexander
(74) *Attorney, Agent, or Firm* — Schott, P.C.

(57) ABSTRACT

The present invention relates to a consumable recognition system for recognizing placement and/or type of consumable containing a food substance for the preparation of a beverage by use of a beverage dispenser. To enable the recognition of placement and/or type of consumable in a
(Continued)

simple, foolproof and easily implementable way an embodiment of the system comprises a light source (31, 301, 311, 321, 331, 341) for emitting light (35) to the consumable (4a, 40, 50, 60, 70, 80, 90), a light sensor (32 302, 312, 322, 332, 342) for sensing light (36) reflected from a reflection element (42, 52, 63, 73, 83, 93) of the consumable to obtain a sensor signal, wherein the sensor signal depends on the position, orientation, fluorescence, phosphorescence and/or polarization characteristic of said reflection element, and a signal processor (33) for recognizing placement and/or type of consumable based on said sensor signal.

9 Claims, 9 Drawing Sheets

(51) Int. Cl.
*A47J 31/40* (2006.01)
*A47J 31/00* (2006.01)

(52) U.S. Cl.
CPC ............. *A47J 31/407* (2013.01); *A47J 31/44* (2013.01); *A47J 31/4403* (2013.01); *A47J 31/4496* (2013.01); *A47J 31/002* (2013.01)

(58) Field of Classification Search
USPC ............................ 99/280, 282, 283, 295, 285
See application file for complete search history.

(56) References Cited

U.S. PATENT DOCUMENTS

| | | | |
|---|---|---|---|
| 2005/0022674 A1 | 2/2005 | Campbell | |
| 2008/0245236 A1 | 10/2008 | Ternite | |
| 2015/0297023 A1* | 10/2015 | Hansen | A47J 31/4492 426/231 |
| 2016/0130076 A1* | 5/2016 | Jarisch | A47J 31/4492 99/285 |
| 2016/0242594 A1* | 8/2016 | Empl | A47J 31/3623 |
| 2017/0305654 A1 | 10/2017 | Kruger | |
| 2017/0325620 A1* | 11/2017 | Rubin | A47J 31/4492 |

FOREIGN PATENT DOCUMENTS

| | | |
|---|---|---|
| EP | 1974638 A1 | 10/2008 |
| EP | 1943930 B1 | 5/2010 |
| EP | 2409608 A1 | 1/2012 |
| EP | 2481330 A1 | 8/2012 |
| JP | 2013-526316 A | 6/2013 |
| JP | 2013-530798 A | 8/2013 |
| WO | 2005044067 A1 | 5/2005 |
| WO | 2005045524 A3 | 5/2005 |
| WO | 2005053485 A1 | 6/2005 |
| WO | 2007/077106 A1 | 7/2007 |
| WO | 2010/042455 A1 | 4/2010 |
| WO | 2012062842 A1 | 5/2012 |
| WO | 2012123440 A1 | 9/2012 |
| WO | 2013072351 A1 | 3/2013 |
| WO | 2013046149 A1 | 4/2013 |
| WO | 2013072297 A1 | 5/2013 |
| WO | 2014/096949 A1 | 6/2014 |

OTHER PUBLICATIONS

Office Action issued in connection with corresponding 201480069976. 2, dated Jul. 18, 2018, 19 pages.
Office Action issued in connection with corresponding 2016-541314, dated Oct. 23, 2018, 13 pages.
English Translation and Notice of Allowance issued in connection with corresponding RU application No. 2016129717 dated Jul. 6, 2018, 22 pages.
English Translation and Office Action issued in connection with corresponding CN application No. 201480069976.2 dated Apr. 1, 2019, 19 pages.
English Translation and Office Action issued in connection with corresponding JP application No. 2016-541314 dated May 27, 2019, 12 pages.
Office Action issued in connection with corresponding EP application No. 14815633.4 dated Jul. 9, 2019, 9 pages.

\* cited by examiner

CONSUMABLE RECOGNITION SYSTEM, SET OF CONSUMABLES AND BEVERAGE DISPENSER

This application is the U.S. National Phase application under 35 U.S.C. § 371 of International Application No. PCT/EP2014/077347, filed on Dec. 11, 2014, which claims the benefit of International Application No. 13198807.3 filed on Dec. 20, 2013. These applications are hereby incorporated by reference herein.

FIELD OF THE INVENTION

The present invention relates to a consumable recognition system for recognizing placement and/or type of consumable containing a food substance for the preparation of a beverage by use of a beverage dispenser. The present invention relates further to a set of consumables comprising at least two consumables for use in a beverage dispenser for preparation of a beverage, to a beverage dispenser for preparation of a beverage, and to a beverage preparation system for preparation of a beverage.

BACKGROUND OF THE INVENTION

The invention relates to the area of appliances (generally referred to as beverage dispensers herein) that prepare a beverage via extraction of food substances through the passage of an extraction fluid, such as hot or cold water, under pressure. The food substance, such as coffee or tea, is contained in consumables that are inserted in these appliances. A beverage may thus generally be coffee, tea, soup, hot or cold chocolate, milk or baby food. Such a beverage making device is e.g. disclosed in WO 2005/053485 A1. Said beverage making device comprises a brewing chamber (hereinafter also called "chamber") for enclosing one or more pads containing a substance from which the beverage is to be brewed, means for supplying water to said brewing chamber, and means for conducting the brewed beverage from the brewing chamber.

More and more types and flavors of these beverages are introduced which creates a new opportunity for innovation. When the type of beverage or ingredient is recognized the appliance can automatically optimize the brewing parameters including one or more of time, temperature, pressure, flow and cup volume to the consumable offered to the appliance. Such a system for the production of beverages is e.g. disclosed in WO 2013/046149 A1, which system comprises a beverage dispenser and a pod to be inserted in the beverage dispenser for the passage of the extraction liquid of the beverage. The pod includes a filtering body (also referred to as substance containing body) which defines a space that contains the food substance from which the beverage is obtained. The filtering body has on the outside a flange. There is a recognition element associated to the filtering body which can be recognized and/or interpreted by a recognition device of the beverage dispenser.

The consumables (also called single-serve units) currently in use are basically of two types. One type of consumable is generally called a "capsule" and is basically a unit with rigid walls containing the food substance and that has two bases through which the extraction water passes. The capsules are placed into chambers defined by two bodies, one shaped to receive most of the capsule and a closing body which tightly seals the chamber. The water is introduced into the chamber and then traverses the capsule. Thanks to the rigid shape of the capsule, the hydraulic seals of the chamber allow the water to basically traverse the capsule without recirculating the extracted substance through the chamber.

A second type of consumable of a flat shape, is generally called a "pod" (or "pad") and consists of two sections made of thin soft material, pierced, paired in order to define a cavity in which the food substance is placed. The material may be for example paper, or a cloth or a non-woven fabric with filtering properties. The two sections are generally circular and are coupled along their outer edges, defining an outer annular flange. The machines which use pods have two half-shells which are sealed to define a chamber where the pod is placed. Specifically, the annular flange of the pod is squeezed, for sealing, between the opposite surfaces of the half-shells, defined outside the chamber.

For most appliances, the brewing parameters are fixed and therefore the same for each beverage. Other appliances can have manual settings, but these have to be adjusted by the user for each type of beverage. When a consumable (in particular its type, i.e. which type of food substance is held within the consumable, e.g. whether it is coffee, decaffeinated coffee, coffee distinguished by grind fineness, roast, blend, flavor, etc.) is recognized automatically by the appliance, the settings can be adjusted automatically. This increases the user convenience. Furthermore, the brewing process is correctly adjusted for each consumable type so that the optimal beverage is created.

EP 1 974 638 A1 discloses a beverage dispenser for preparation of a beverage by use of a consumable in the form of capsules. The beverage dispenser comprises a recognition system which is able to distinguish different types of capsules by use of a color coding provided to the capsules. According to WO 2013/072297 A1 and WO 2012/062842 A1 optically readable codes, in particular barcodes, are provided at the different types of capsules to distinguish them. The device disclosed in EP 2 409 608 A1 measures the position of the end of a rod sliding in a shaft to distinguish different sizes of capsules. WO 2005/044067 A1 discloses an apparatus including an optical and/or magnetic reader for reading information off a container, wherein said information is invisible to the naked eye.

SUMMARY OF THE INVENTION

It is an object of the present invention to provide a consumable recognition system for recognizing placement and/or type of consumable in a simple, foolproof and easily implementable way. It is a further object of the present invention to provide a corresponding set of consumables comprising at least two consumables for use in a beverage dispenser for preparation of a beverage, a corresponding beverage dispenser for preparation of a beverage, and a corresponding beverage preparation system for preparation of a beverage.

In a first aspect of the present invention a consumable recognition system is presented comprising:
a light source for emitting light to the consumable,
a light sensor for sensing light reflected from a reflection element of the consumable to obtain a sensor signal, wherein the sensor signal depends on the position, orientation, fluorescence, phosphorescence and/or polarization characteristic of said reflection element, and
a signal processor for recognizing placement and/or type of consumable based on said sensor signal.

In a second aspect of the present invention a consumable recognition system is presented comprising:
a light source for emitting light to the consumable to couple into a light guide of the consumable, a light sensor for sensing light at one or more predetermined positions, said light being guided through and emitted by said light guide at the one or more predetermined positions to obtain a sensor signal, wherein the sensor signal depends on the one or more positions of light emission and/or light transmission characteristic of said light guide, and a signal processor for recognizing placement and/or type of consumable based on said sensor signal.

In a further aspect of the present invention a set of consumables is presented, particularly for use with a consumable recognition system according to the first aspect, wherein each consumable of said set comprises:

a filtering body defining a space containing a food substance, from which the beverage is obtained, a reflection element for reflecting incident light in a predetermined way, wherein the way depends on the position, orientation, fluorescence, phosphorescence and/or polarization characteristic of said reflection element, wherein said reflection element has a different position, orientation, fluorescence, phosphorescence and/or polarization characteristic for each type of consumable of the set of consumables.

In still another aspect of the present invention a set of consumables is presented, particularly for use with a consumable recognition system according to the second aspect, wherein each consumable of said set comprises:

a filtering body defining a space containing a food substance, from which the beverage is obtained, a light guide for guiding light coupled in by a light source and for emitting the guided light at one or more predetermined positions, wherein light guide has different positions of light emission and/or different light transmission characteristics for each type of consumable of the set of consumables.

In still a further aspect of the present invention a beverage dispenser is presented comprising:

a consumable recognition system as disclosed herein for recognizing placement and/or type of consumable, a chamber for receiving the consumable and for the passage of extraction liquid through the consumable, a liquid processing unit for the passage of extraction liquid through the consumable, and a controller for controlling one or more parameters of the beverage dispenser according to the recognized placement and/or type of consumable.

In yet a further aspect of the present invention a beverage preparation system is presented comprising:

a beverage dispenser as disclosed herein, and a consumable from among a set of consumables as disclosed herein containing a food substance, from which the beverage is obtained by use of extraction liquid, said consumable being arranged in the chamber of the beverage dispenser.

Preferred embodiments of the invention are defined in the dependent claims. It shall be understood that the set of consumables, beverage dispenser and beverage preparation system have similar and/or identical preferred embodiments as the claimed consumable recognition system and as defined in the dependent claims.

The present invention is based on the idea to discern/recognize the consumable based on the reflection of light, i.e. based on the detection of the optical response(s) of (one or more portions of) the consumable to one or more imposed optical stimuli, or based on the detection of optical transmission properties through (a) specific portions(s) of the consumable. The light source (e.g. an LED or laser), which may be provided at one or more predetermined positions, features a light (e.g. a collimated light beam or omnidirectional light) that shines onto a specific reflective part (i.e. the reflection element) of the consumable that has e.g. been set in a determined angle, has a specific location or has defined reflective characteristics or that transmits through a specific element (i.e. the light guide) having a predetermined transmission characteristic. By varying these parameters for each consumable type, a sensor signal, e.g. a specific light intensity readout, can be generated by a sensor (e.g. a photo diode or a camera), which can then be linked to the correct beverage preparation parameters.

Further, it is possible in the same way to detect if a consumable has been inserted into the chamber of the beverage dispenser or not. At least one characteristic of the sensor signal depends on the light reflective characteristic of the reflection element or the light transmission characteristic of the light guide of the consumable by which the different types of consumables distinguish and will allow distinguishing the different types by evaluating said at least one characteristic. Said characteristic of the sensor signal (e.g. a current or voltage signal) or an electrical signal derived from the sensor signal may be the sensor/electrical signal's amplitude and/or phase, potentially as a function of frequency. Hence, in an embodiment, the sensor signal's amplitude at a specific (predetermined) frequency is evaluated to distinguish different types of consumables.

In this context, distinguishing the type of consumable does not only mean to distinguish if the consumable is a capsule or a pad, but mainly means to distinguish the type of food substance contained (e.g. whether it is coffee, decaffeinated coffee, coffee distinguished by grind fineness, roast, blend, flavor, etc.) and/or the quantity of substance. Based on the recognized type, the beverage dispenser, possibly in combination with commands selected by the user, sets the correct process parameters, such as for example the temperature of the water, the quantity of water to be used, the pressure and/or the speed of the water supply, the infusion time, etc. For instance, if the type of consumable is recognized the kinds of beverages that may (preferably) be prepared may be shown on a display to the user for user selection.

It should be noted that information obtained via the reflection element and/or the light guide of the consumable may also concern other aspects, which are not linked to the preparation of the beverage, such as for example statistics. For example, the beverage dispenser may memorize the number of different types of consumables used, or other data which may be useful for managing machine maintenance, or orders for new consumables based on actual consumption, etc.

In a practical embodiment of the consumable recognition system according to the first aspect said light sensor comprises a plurality of sensor elements, wherein the number, the position and/or the sensed light intensity of the sensor elements, which sensed light reflected from the reflection element, depends on the position, orientation, fluorescence, phosphorescence and/or polarization characteristic of said reflection element, wherein the sensor signal is formed based on the number, position and/or the sensed light intensity of the sensor elements, which sensed light reflected from the reflection element.

In another practical embodiment said light source and/or said light sensor are arranged at a fixed position with respect to the consumable and said light source is configured to emit a light beam onto a predetermined spot or area of a predetermined surface of the consumable. For instance, after inserting the consumable at its predetermined position within the chamber of the beverage dispenser the recognition process is performed. Therefore, the predetermined spot or area is known in advance and fixed.

In an alternative embodiment said light source and said light sensor are arranged at a movable position with respect to the consumable and wherein said light source is configured to emit a light beam, preferably in a predetermined direction, so that the light beam sweeps over a predetermined area of a predetermined surface of the consumable. For instance, the light source and the light sensor may be mounted at the lid of a beverage dispenser so that during the closing of the lid the recognition process is performed.

Preferably, said light sensor is configured to sense the intensity, color, direction of incidence and/or polarization of light reflected from said reflection element. The particular implementation depends on the respective application and the desired design.

In a practical embodiment of the consumable recognition system according to the second aspect said light sensor comprises a plurality of sensor elements arranged at different predetermined positions so that each sensor element is able to sense light from a different predetermined position, at which light may be emitted from said light guide, wherein the number, the position and/or the sensed light intensity of the sensor elements, which sensed light emitted from the light guide, depends on the one or more positions of light emission and/or light transmission characteristic of said light guide, wherein the sensor signal is formed based on the number, position and/or the sensed light intensity of the sensor elements, which sensed light emitted from the light guide. The light guide may, for instance, be an optical fiber, which can be easily embedded at or within a consumable and which has, in this embodiment, a plurality of light exits at different positions for distinguishing the different types of consumables.

In another embodiment said light source comprises a plurality of source elements arranged at different predetermined positions so that each source element is able to couple light at a different predetermined position into said light guide, wherein the sensor signal is formed based on a characteristic of the sensed light, in particular the intensity, color and/or polarization of the sensed light emitted from the light guide. Again, the light guide may be an optical fiber, which has, in this embodiment, a plurality of light input at different positions, at which light may be coupled in by the different light sources according to a predetermined sequence.

There are various embodiments of consumables that are adapted for being used with a corresponding consumable recognition system. In one embodiment the reflection element is a surface or part of a surface of the filtering body, in particular a rim, bottom surface, cover or side wall or a part thereof, which has a predetermined inclination with respect to the incident light.

In another embodiment the reflection element comprises one or more predetermined reflective spots and/or reflective areas of a predetermined surface of the filtering body.

The reflection element may comprise a fluorescent, phosphorescent and/or polarization-affecting material.

BRIEF DESCRIPTION OF THE DRAWINGS

These and other aspects of the invention will be apparent from and elucidated with reference to the embodiment(s) described hereinafter. In the following drawings

DETAILED DESCRIPTION OF EMBODIMENTS

Figure 1A:
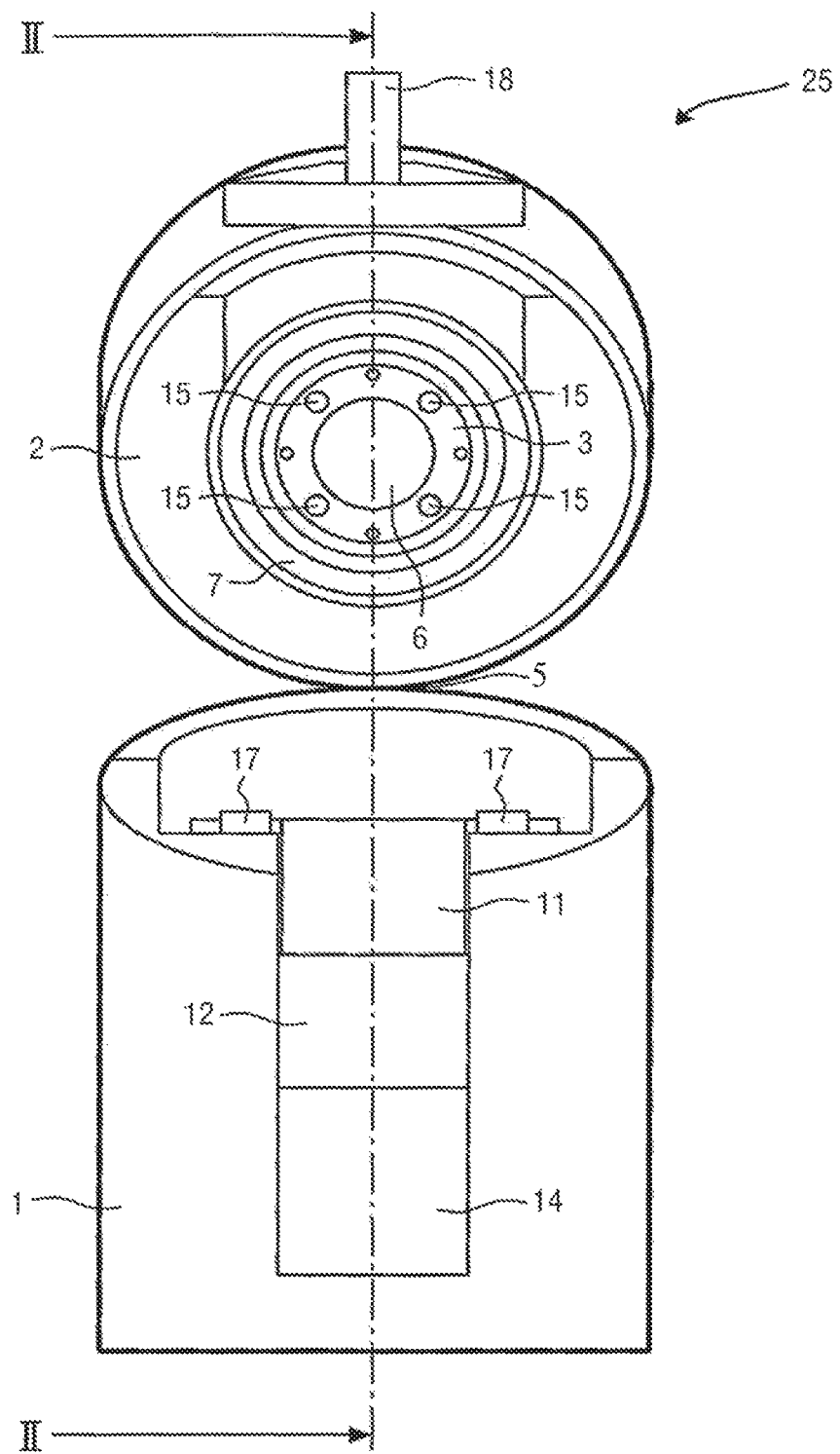
FIG. 1 shows different views of an embodiment of a beverage dispenser according to the present invention.

FIG. 1 shows different views of an embodiment of a beverage dispenser 25 in the form of a coffee making device that generally, together with a consumable 4 (alternately referred to herein as a 'pad'), forms a beverage preparation system. The coffee making device (i.e. the beverage dispenser 25) includes a (schematically depicted) consumable recognition system 30 according to the present invention. The coffee making device uses soft pads as consumables, but it shall be noted here that the invention is neither limited to the use of pads nor limited to coffee making devices. In other embodiments the beverage dispenser is configured to be used for making other beverages than coffee, e.g. tea, hot or cold milk, soup, baby food, etc. Further, pods or capsules may be used as consumables, and the consumables generally contain a corresponding food substance for the preparation of the respective beverage by use of the beverage dispenser.

The coffee making device comprises a stationary part 1 and a hinging part 2. The stationary part 1 comprises the lower wall comprising a metal part 8, and a plastic element 9, of the brewing chamber 19 and the hinging part 2 includes the upper wall 3 of the brewing chamber 19. The stationary part 1 furthermore comprises a water container and means for heating the water (or, more generally, an extraction liquid) and pumping a predetermined quantity of the heated water to the brewing chamber 19, which portions of the device are only schematically shown as liquid processing unit 20 for the passage of extraction liquid through the pad 4.

FIG. 1A is a front view of the uppermost portion of the coffee making device showing the stationary part 1 and the hinging part (or lid) 2 of the device. The lid 2 is represented in the open position, i.e. the position in which the brewing chamber 19 is accessible, for example for replacing the pad 4. The upper wall 3 of the brewing chamber is in a substantially vertical position in this case.

Figure 1B:
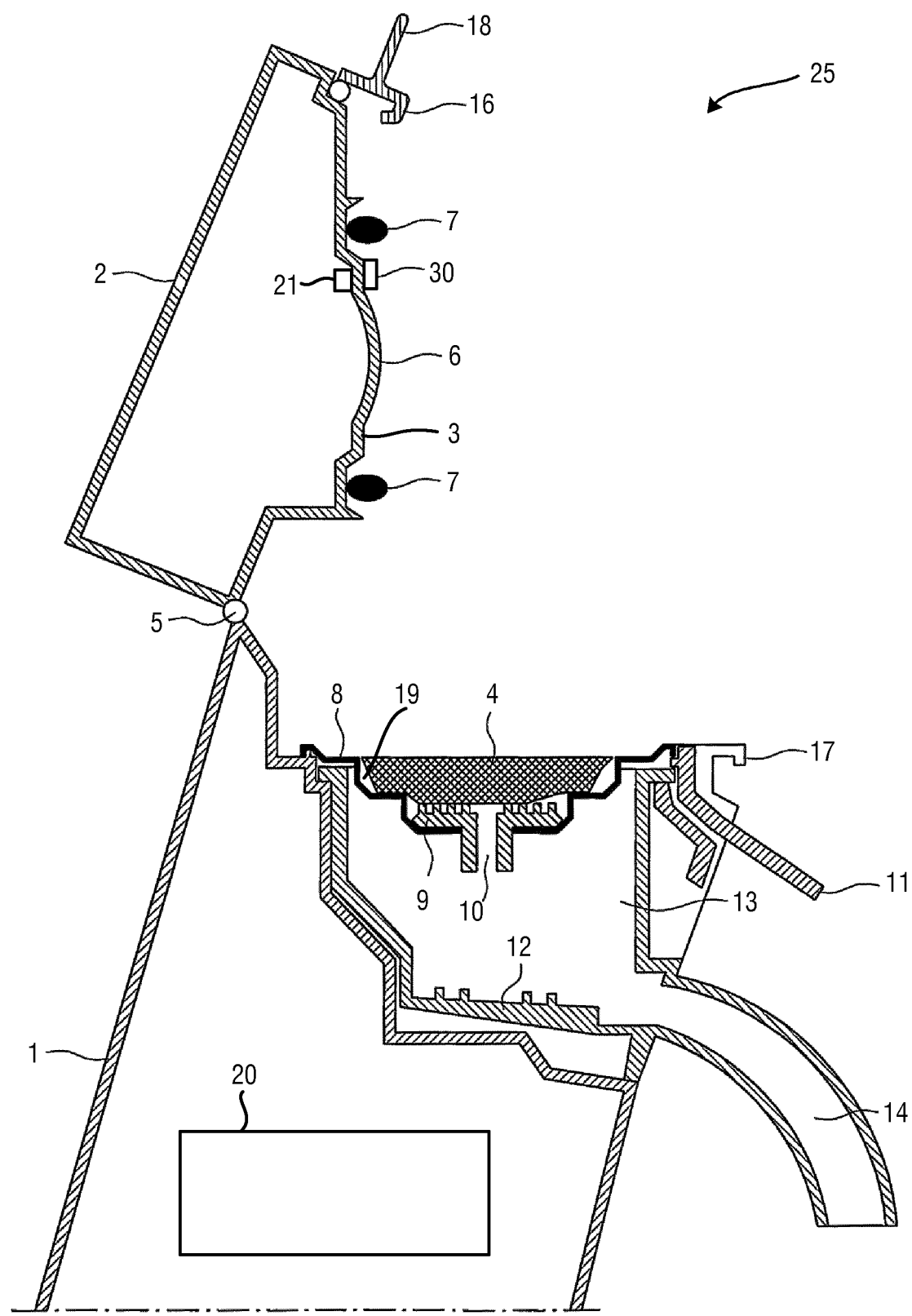
Figure 1C:
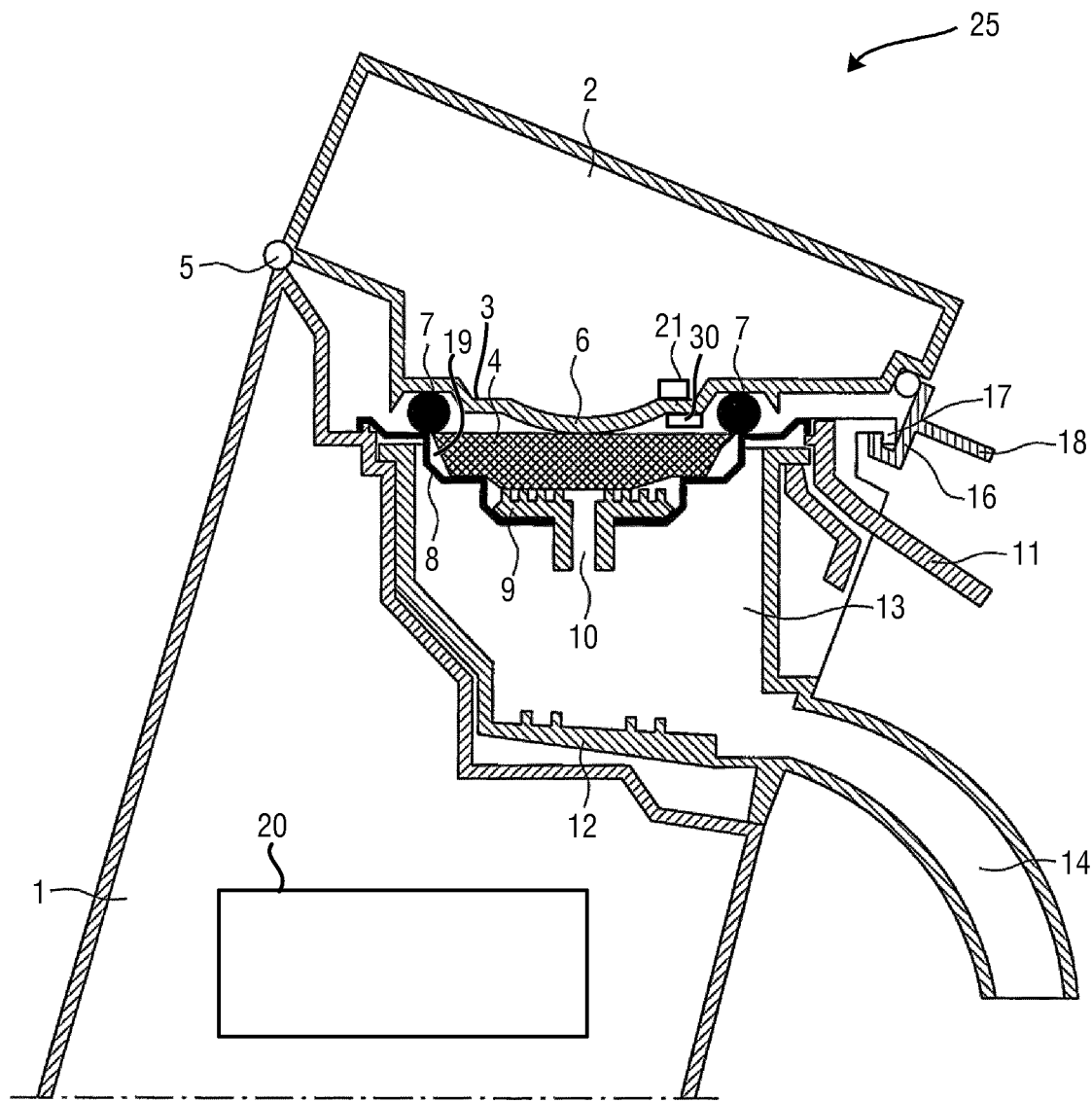

FIGS. 1B and 1C are cross-sectional views with the lid 2 shown in open position (FIG. 1B) and in closed position (FIG. 1C) respectively. The lid 2 hinges about an axis 5, so that it can make a rotating movement. The upper wall 3 of the brewing chamber is provided with a spherical protrusion 6 in its central part, i.e. a dome in the upper wall 3. A flexible sealing ring 7 is attached to the hinging lid 2 around the upper wall 3.

A first removable part, forming the lower wall of the brewing chamber, is composed of a metal part 8 with attached to it a plastic element 9 having a central outflow opening 10. At its upper side, the plastic element 9 is provided with a number of protrusions to support the pad 4 and to create space for conducting the brewed beverage between the protrusions. The first removable part 8, 9 is designed to contain one pad 4. It can be replaced by a different removable part being designed to contain two pads 4, in which case it encloses more space.

The metal part 8 and the plastic element 9, which combined form the first removable part, are provided with a handle 11 to facilitate its removal from the stationary part 1 of the device. The metal part 8 and the plastic element 9 ('the first removable part') can be removed for replacement or cleaning. Below metal part 8 and the plastic element 9 ('the first removable part') there is a second removable part 12, enclosing a beverage collection chamber 13 and provided with a beverage outflow tube 14 that extends outside the stationary part 1 of the device. The brewed beverage, collected in collection chamber 13, leaves the device through outflow tube 14 and can be caught in a cup or the like.

When the lid 2 is closed, the flexible sealing ring 7 abuts against the upper wall 3 as well as against the metal part 8 of the metal part 8 and the plastic element 9 ('the first removable part'), so that the brewing chamber 19 is closed, except for the holes 15 (or nozzles) in the upper wall 3 for supplying heated water to the brewing chamber, and except for the central outflow opening 10. The brewing chamber 19 may enclose a pad 4 as shown in FIG. 1C. Heated water is supplied through holes 15 in the upper wall 3 and passes through the pad 4 to extract coffee. The brewed coffee leaves the brewing chamber through the central outflow opening 10. Then the brewed coffee will be collected in the beverage collection chamber 13 and subsequently leave the device through outflow tube 14.

As is shown in FIG. 1C, the lid 2 is kept closed by a hinging latch 16 engaging a downwardly extending edge 17 of the stationary part 1 of the device. The hinging latch 16 can only be released in that the lid 2 is moved in downward direction. The upper wall 3 of the brewing chamber is moved towards the metal part 8 and the plastic element 9 ('the first removable part') thereby, so that the spherical protrusion 6 is pressed into the pad 4. This movement squeezes the pad 4, so that excess residue liquid will leave the pad 4 and will leave the brewing chamber through the central outflow opening 10.

The consumable recognition system 30 allows recognizing placement and/or type of consumable in a simple, foolproof and easily implementable way. Once the type of consumable (pod) 4 is recognized one or more parameters of the beverage dispenser 25 are controlled by a controller 21 according to the recognized type of consumable. For instance, just to give a simple example, if it is recognized that the consumable contains fine grinded coffee (which is preferably used for making espresso), the liquid is pressed with a higher pressure through the pod than in case the consumable contains regular grinded coffee (as preferably used for making coffee). Parameters that can generally be controlled may be one or more of the temperature of the water, the quantity of water to be used, the pressure and/or the speed of the water supply, the infusion time, flow and cup volume, etc. The consumable recognition system is further suitable to recognize placement of a consumable into the brewing chamber, i.e. it can be recognized if or if not a consumable has been inserted, based on which information the dispensing process may be started automatically (if a consumable has been inserted) or a signal may be issued indicating that a consumable needs to be inserted.

The general idea of using a consumable recognition system and a control of one or more parameters of the beverage dispenser based on the recognized type of the consumable can also be used in other types of beverage dispensers using e.g. capsules as consumables. Such beverage dispensers are widely known and used. An example of such a beverage dispenser is e.g. described in WO 2012/123440 A1, which also includes a sensing arrangement for detecting an event related to the insertion of a capsule and/or the presence of a capsule as well as the type of capsule in order to automate the preparation of the beverage.

Hence, even if the various embodiments of consumables and consumable recognition systems explained in the following refer to a particular type of consumable and, thus, a particular type of beverage dispenser, the respective embodiments shall generally not be understood to be limited only to this type of consumable and/or this type of beverage dispenser.

The general layout of two embodiments of a consumable recognition system and a corresponding consumable according to the present invention is depicted in FIG. 2. Both embodiments of the consumable recognition system 30 comprise a light source 31, a light sensor 32 and a signal processor 33 for recognizing placement and/or type of consumable based on a sensor signal obtained by the light sensor 32.

Figure 2A:
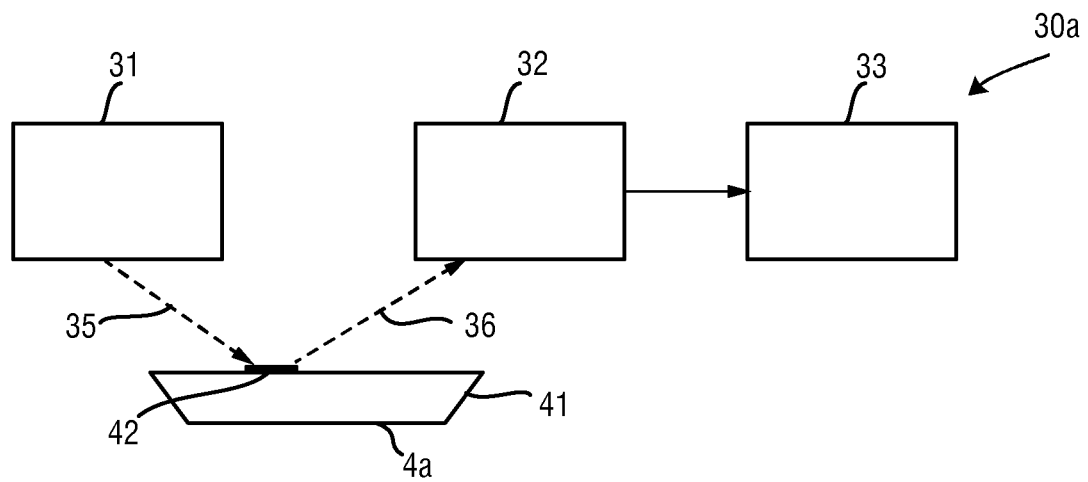
FIG. 2 shows a schematic diagram of two general layouts of a consumable recognition system and a corresponding consumable according to the present invention.

In a first general embodiment of the consumable recognition system 30a schematically shown in FIG. 2A the light source 31 is configured to emit light 35, preferably in a predetermined direction (but generally also omnidirectional light emission may be used), to the consumable 4a and the light sensor 32 is configured to sense reflected light 36 reflected from a reflection element 42 of the consumable 4a to obtain a sensor signal, wherein the sensor signal depends on the position, orientation, fluorescence, phosphorescence and/or polarization characteristic of said reflection element 42. The consumable 4a according to this embodiment generally comprises a filtering body 41 defining a space containing a food substance, from which the beverage is obtained and a reflection element 42 for reflecting incident light in a predetermined way, wherein the way depends on the position, orientation, fluorescence, phosphorescence and/or polarization characteristic of said reflection element 42. Said reflection element 42 has a different position, orientation, fluorescence, phosphorescence and/or polarization characteristic for each type of consumable of the set of consumables.

Figure 2B:
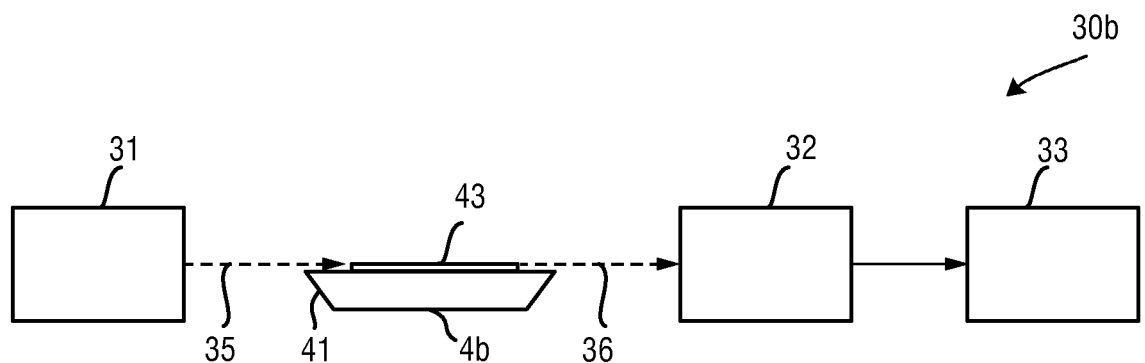

In a second general embodiment of the consumable recognition system 30b schematically shown in FIG. 2B the light source 31 is configured to emit light 35, preferably in a predetermined direction, to the consumable to couple into a light guide 43 of the consumable 4b and the light sensor 32 is configured to sense reflected light 36 at one or more predetermined positions, said light being guided through and emitted by said light guide 43 at the one or more predetermined positions to obtain a sensor signal, wherein the sensor signal depends on the one or more positions of light emission and/or light transmission characteristic of said light guide. The consumable 4b according to this embodiment generally comprises a filtering body 41 defining a space containing a food substance, from which the beverage is obtained, and a light guide 43 for guiding light coupled in by a light source and for emitting the guided light at one or more predetermined positions. Said light guide 43 has different positions of light emission and/or different light transmission characteristics for each type of consumable of the set of consumables.

Next, several detailed embodiments of a consumable and corresponding detailed embodiments of the consumable recognition system according to the present invention will be explained. For the consumable it will be explained how the different types of consumables of a set of consumables containing those different types can be distinguished and how the consumable recognition system is accordingly constructed. For the respective consumable recognition systems the signal processor is generally not explicitly shown.

Figure 3A:
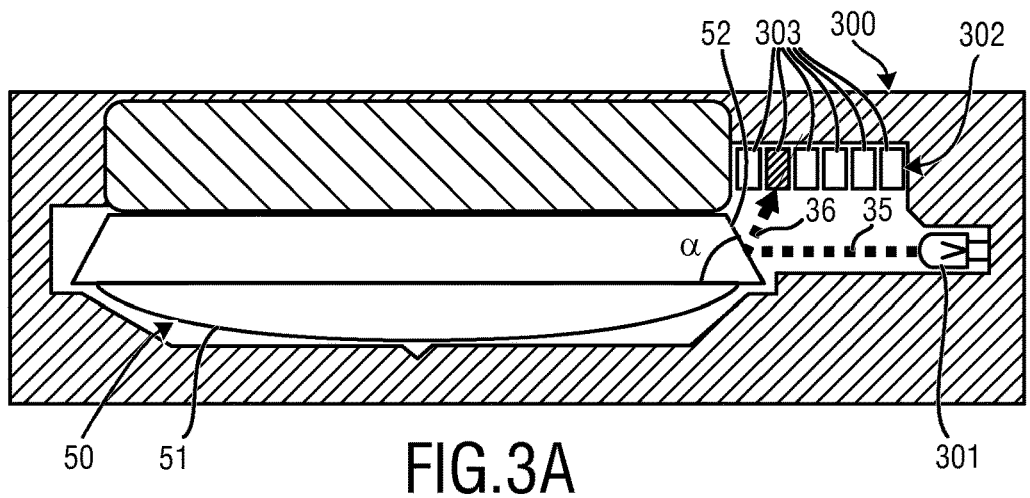
FIG. 3 shows a cross-sectional view and a perspective view of a first embodiment of a consumable as well as a corresponding consumable recognition system according to the present invention.
Figure 3B:
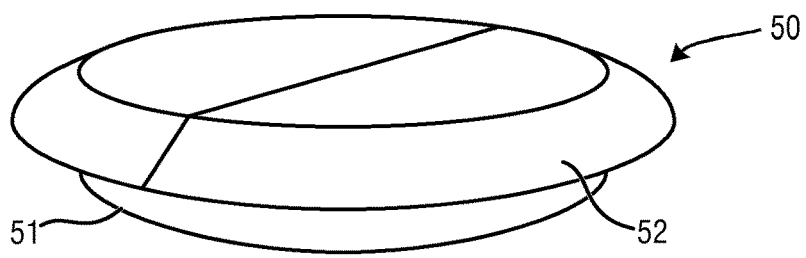

FIG. 3 shows a cross-sectional view (FIG. 3A) and a perspective view (FIG. 3B) of a first embodiment of a consumable 50 as well as a corresponding consumable recognition system 300 according to the present invention. The consumable 50 comprises a filtering body 51 having a skewed rim 52 with a specific angle α. Light 35 (e.g. collimated) emitted by a light source 301, e.g. an LED, shines onto the skewed rim 52 of the consumable 50. This light is reflected in a specific direction due to the tilt angle α and the reflected light 36 is caught by a sensor array 302 comprising a number of sensor elements 303, e.g. a number of photo diodes. The sensor elements 303 that are triggered by the reflected light are used to translate the direction of the reflected light 36 to the placed type of consumable 50. By changing the reflection properties of the skewed rim 52, the intensity of the reflected light 36 can also be varied. This can create an extra variable for the identification of the type of consumable 50. Since the angle α is different for each type of consumable, the different types of consumables can be distinguished.

Figure 4A:
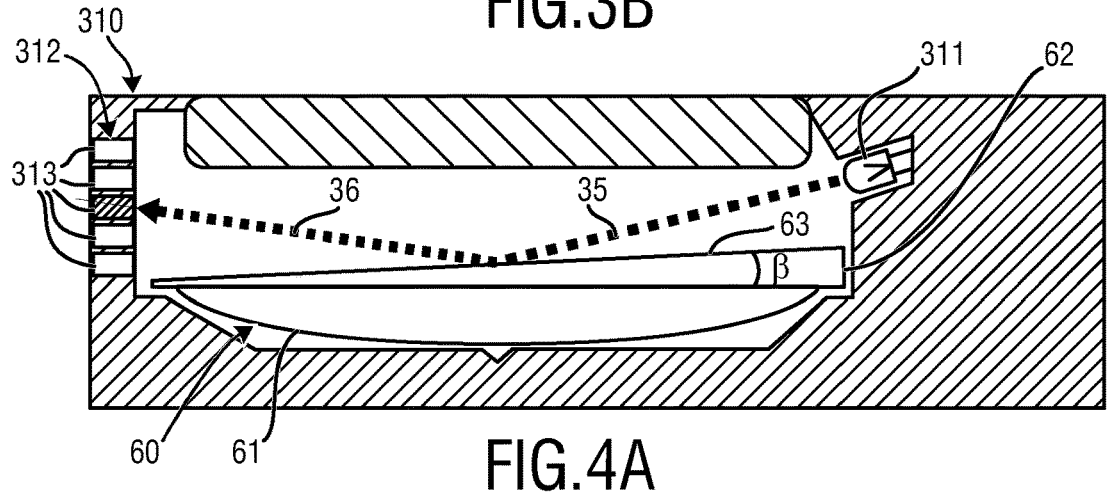
FIG. 4 shows a cross-sectional view and a perspective view of a second embodiment of a consumable as well as a corresponding consumable recognition system according to the present invention.
Figure 4B:
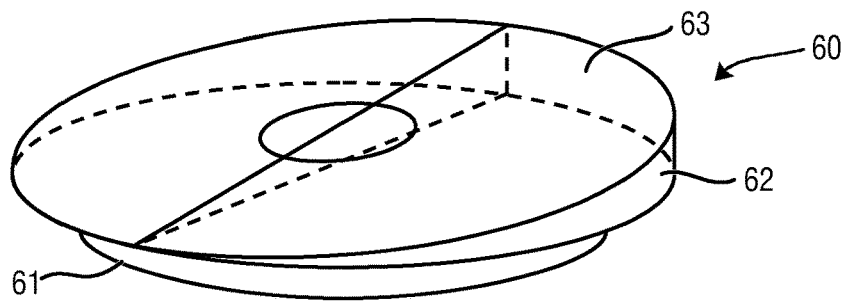

FIG. 4 shows a cross-sectional view (FIG. 4A) and a perspective view (FIG. 4B) of a second embodiment of a consumable 60 as well as a corresponding consumable recognition system 310 according to the present invention. The top 62 of the filtering body 61 of the consumable 60 is tilted in a specific angle β and can optionally feature an extra reflective surface 63. Light 35 (e.g. collimated light) emitted by the light source 311, e.g. an LED, shines onto the top 62 of the consumable 60. This light is reflected in a specific direction due to the tilted top 62 of the consumable 60 and the reflected light 36 is caught by a sensor array 312 comprising a number of sensor elements 313, e.g. a number of photo diodes. The sensor elements 313 that are triggered are used to translate the direction of the reflected light 36 to the placed type of consumable. By changing the reflection properties of the extra reflective surface 63, the intensity of the reflected light 36 can also be varied. This can create an extra variable for the identification of the type of consumable 60. The consumable 60 may be held in place by a pin or other element (not shown) arranged on the inner side of the lid. Since the angle β is different for each type of consumable, the different types of consumables can be distinguished.

It shall be noted that in another variation of the embodiments shown in FIGS. 3 and 4 not (or not only) a certain surface (i.e. the skewed rim 52 or the top 62) is inclined at a certain angle, but this effect may also be achieved if the filtering body is differently inclined from type to type. For instance, the bottom surface of the filtering body may be inclined at a certain angle so that the consumable is arranged at a certain angular position within the chamber which substantially leads to the same effect.

Figure 5A:
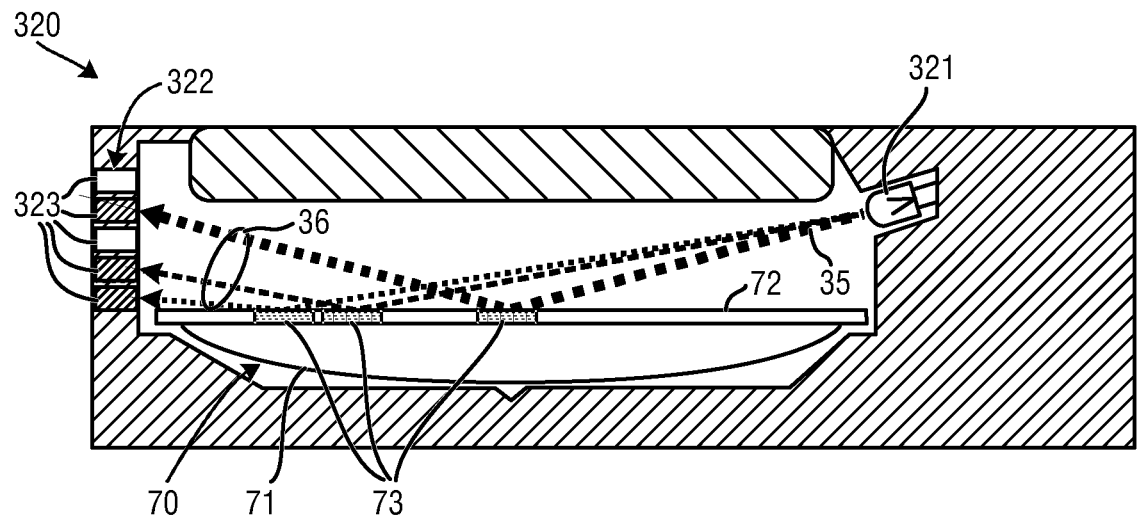
FIG. 5 shows a cross-sectional view and a perspective view of a third embodiment of a consumable as well as a corresponding consumable recognition system according to the present invention.
Figure 5B:
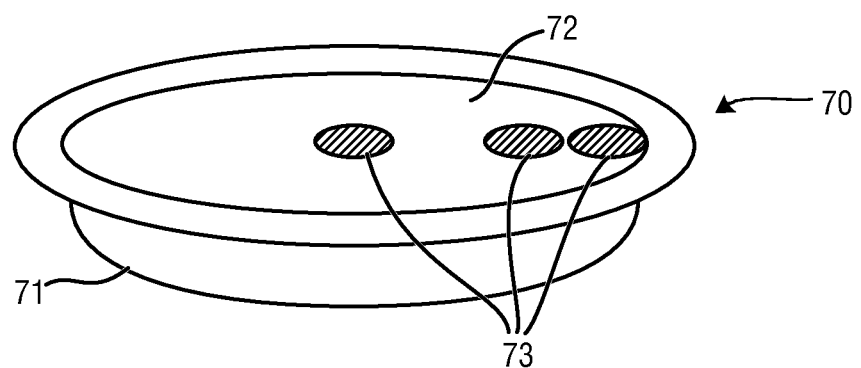

FIG. 5 shows a cross-sectional view (FIG. 5A) and a perspective view (FIG. 5B) of a third embodiment of a consumable 70 as well as a corresponding consumable recognition system 320 according to the present invention. The top surface 72 of the filtering body 71 of the consumable 70 comprises several reflective spots 73 (sometimes referred to as 'reflective elements') on specific locations. Light 35 emitted by a light source 321 shines onto the top surface 72 of the consumable 70. This light is reflected in several directions due to the reflective spots 73 on the consumable and the reflected light 36 is caught by a sensor array 322 comprising a number of sensor elements 323, e.g. a number of photo diodes. The sensor elements 323 that are triggered are used to translate the direction of the reflected light 36 to the placed type of consumable. By changing the reflection properties of the reflective spots 73, the intensity of the reflected light 36 can also be varied. This can create an extra variable for the identification of the type of consumable 70. Since the positions and/or numbers of the reflective spots 73 is different for each type of consumable, the different types of consumables can be distinguished.

Figure 6A:
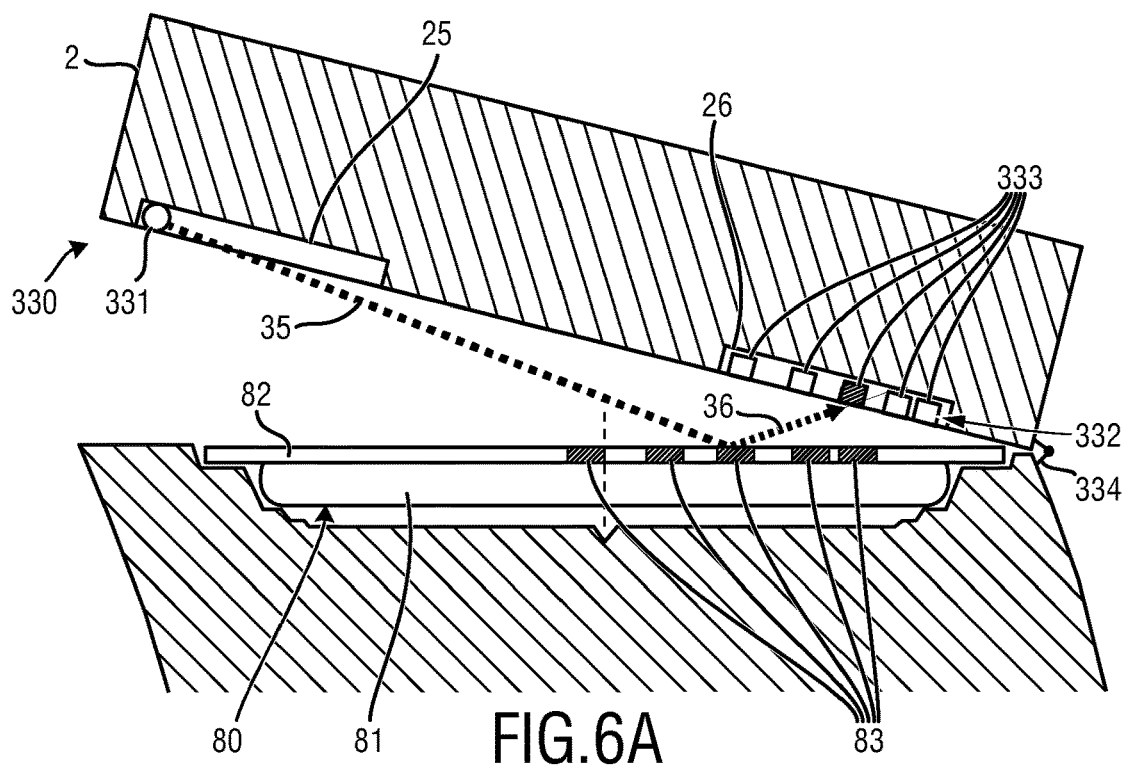
FIG. 6 shows a cross-sectional view and a perspective view of a fourth embodiment of a consumable as well as a corresponding consumable recognition system according to the present invention.
Figure 6B:
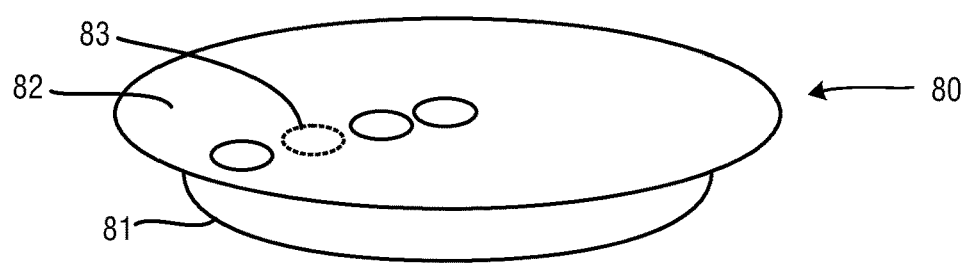

FIG. 6 shows a cross-sectional view (FIG. 6A) and a perspective view (FIG. 6B) of a fourth embodiment of a consumable 80 as well as a corresponding consumable recognition system 330 according to the present invention. The light source 331, e.g. an LED, and the light sensor 322, e.g. an array of sensor elements 333 (e.g. photo diodes) are arranged at the inner side of the closing mechanism 2, e.g. the lid, of the beverage dispenser 25, for instance in corresponding recesses 26, 27. The top surface 82 of the filtering body 81 of the consumable 80 comprises one reflective spot 83 (sometimes referred to as 'reflective element') on a specific location. Light 35 (e.g. collimated light) emitted by the light source 331 shines onto the top 82 of the consumable 80 under a set angle during the closing of the lid 2. The light 35 is only reflected by the consumable 80 when it hits the reflective spot 83 during the closing movement. This creates a defined path for the reflected light 36, which is thus only caught by a particular sensor element 333 of the sensor array 332 (or causes a particular reflection pattern at the sensor array 332). The sensor element 333 that is triggered can then be matched with the placed type of consumable. Since the position of the reflective spot 83 is different for each type of consumable, the different types of consumables can be distinguished.

In a variation of the fourth embodiment an angle detector 334 (or tilt detector) is provided as shown in FIG. 6A for sensing the closing angle of the lid 2 at the moment when a reflection signal is received at a sensor element 333. This information will then be used together with the information about which sensor element 333 sense a reflection to identify the particular type of consumable.

In another embodiment the number of light detectors that will 'see' light during the action of closing the lid depends on the arrangement of the reflection elements on the consumable. This provides for the type recognition without angle information (i.e. it depends on if light is detected instead of when light is detected).

It shall be noted that in the embodiments shown in FIGS. 5 and 6 the reflective spots 73, 83 need not to be configured as spots, but may also be configured differently, e.g. as stripes, rings or ring section. A ring has e.g. the advantage that it enables rotationally invariant positioning of the consumable within the chamber.

Still further, in further variations the reflective elements in the above explained embodiments may be configured such that the reflection provides a certain reflection pattern, e.g. a speckle pattern, which is different from type to type, can be sensed by the light sensor and can then be used to distinguish the different types of consumables.

Figure 7:
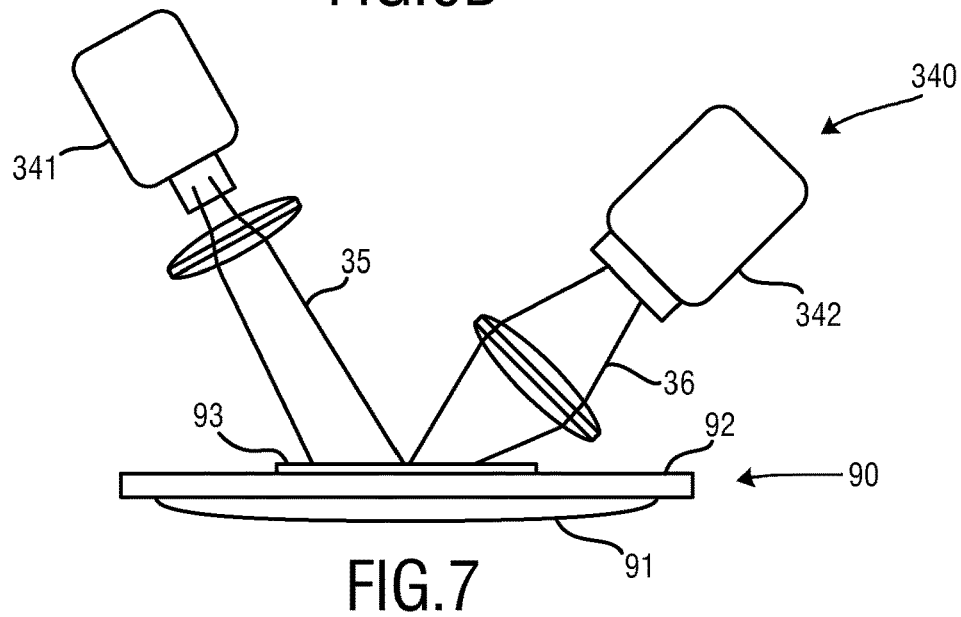
FIG. 7 shows a side view of a fifth embodiment of a consumable as well as a corresponding consumable recognition system according to the present invention.

FIG. 7 shows a side view of a fifth embodiment of a consumable 90 as well as a corresponding consumable recognition system 340 according to the present invention. In this embodiment the consumable recognition is done using color detection of reflected light from a reflection element 93 provided, in this embodiment, on the top 92 of the filtering body 91, which reflection element 93 comprises fluorescent and/or phosphorescent material(s). The illumination is typically done with blue/violet or ultraviolet light 35 from the light source 341 (e.g. a blue LED or a UV or blue laser). The reflected light 36 from the reflection element 93 is detected with one or more photodiodes or a camera 342. Coding of the different types of consumables is established by varying the amount of material (which affects the intensity of the reflected light 36), the type of material (which affects the color of the reflected light 36) and/or the position of the reflection element 93 (which affects the spatial information).

In a variation of the fifth embodiment a polarization-affecting material, i.e. a material that affects the polarization of incident light so that the reflected (or transmitted) light has a different polarization, is used for the reflection element 93 (or a transmission element through which the incident light 35 is transmitted). When detecting the reflected light 36 reflected from or transmitted through such an element, the polarization of the reflected light 36 is detected, which information can be used for identification of the type of consumable, since every type is provided with an element having a different effect on the polarization.

Further, the reflection element can have a reflection coefficient that depends on the polarization of the light. In that case the detection/identification relies on the signal strength of the sensor. In this case, the light source emits light with a certain polarization and/or the light sensor has a polarization dependent sensitivity.

For instance, when having a consumable with a hard material edge or rim, this edge or rim can be made of plastic. In fabrication, the degree with which the plastic rim affects polarization can easily be set by the amount of stretching applied to the plastic. Also the reflection element 93 (or a transmission element) may be configured as such a plastic. In a more advanced embodiment such a method may also be used to create a unique identifier for each individual pod as it can create a difficult to reproduce optical polarization pattern, i.e. a physically unclonable feature. This could be used to verify authenticity of the consumable brand used.

Figure 8:
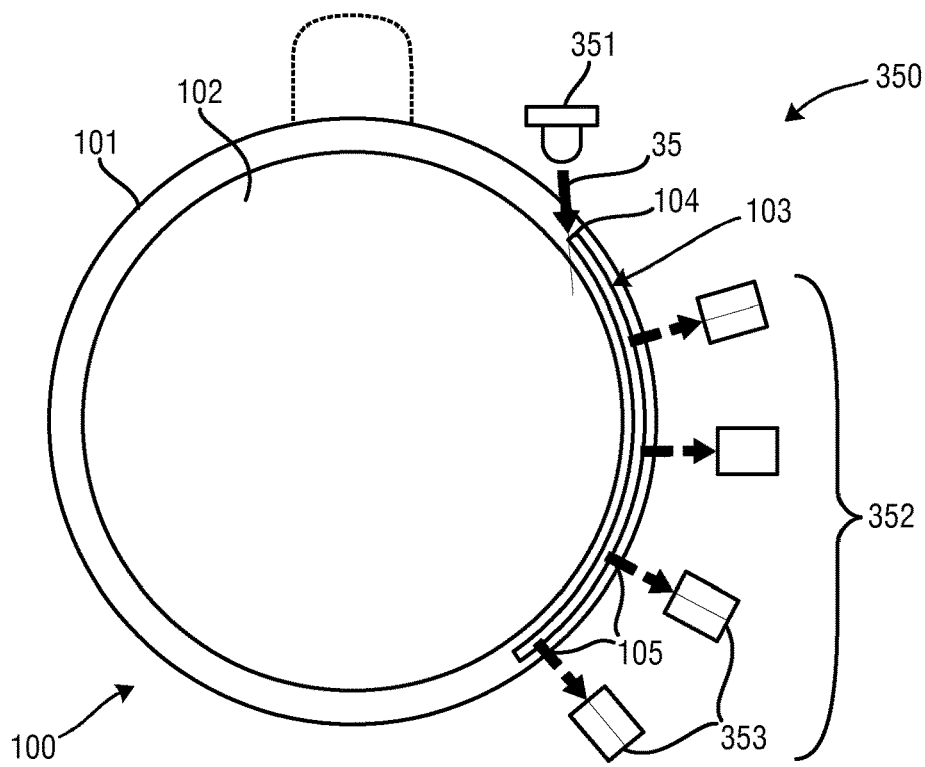
FIG. 8 shows a top view of a sixth embodiment of a consumable as well as a corresponding consumable recognition system according to the present invention.

FIG. 8 shows a top view of a sixth embodiment of a consumable 100 as well as a corresponding consumable recognition system 350 according to the present invention. Optical transmission through a light guide 103, e.g. an optical fiber, that is placed on a surface (here the top 102) of the filtering body 101 of the consumable 100 is measured. At a predetermined location, e.g. the end surface 104 of the light guide 103, light 35 emitted by the light source 351 (e.g. an LED) is coupled into the light guide 103. At one or more other locations 105 (e.g. at the side surface along the light guide 103), reflected light 36 that is emitted out of the light guide 103 is detected using sensor elements 353 of a sensor array 352.

The leaking/coupling of light 36 out of the light guide 103 at the measurement locations 105 can be manipulated by modifying the light guide 103, e.g. by removal of the cladding of an optical fiber, which provides the possibility of coding of the type of consumable. In a typical implementation a binary coding will be employed: light is or is not coupled out of the light guide 103 at the measurement locations 105. The number of coding possibilities is thus $2^{Ns}$, with Ns the number of measurement locations.

Figure 9:
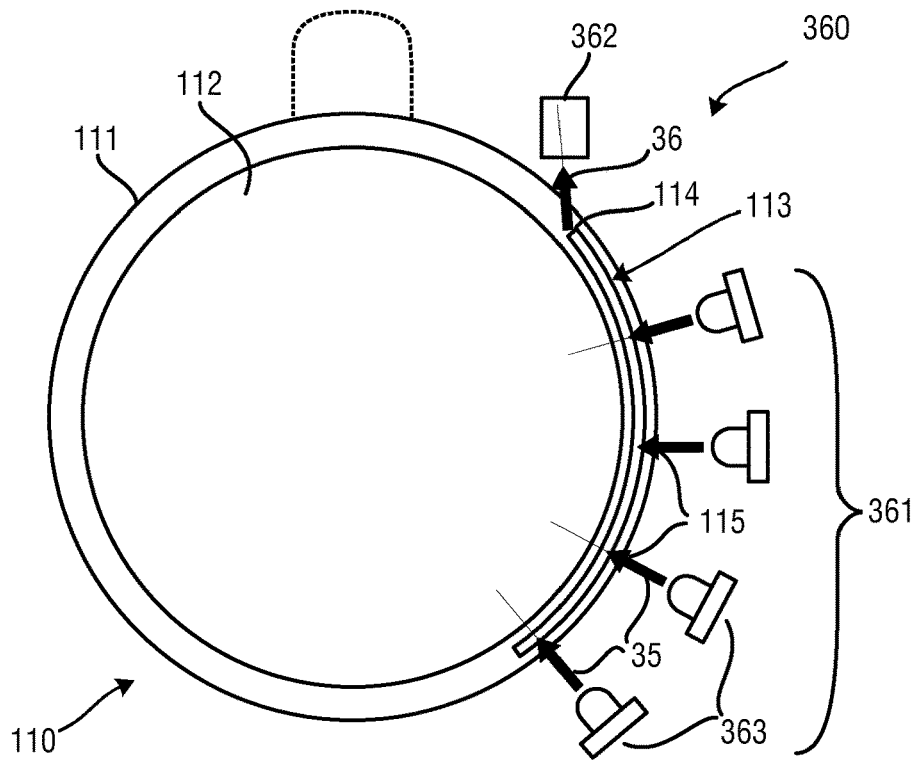
FIG. 9 shows a top view of a seventh embodiment of a consumable as well as a corresponding consumable recognition system according to the present invention.

FIG. 9 shows a top view of a seventh embodiment of a consumable 110 as well as a corresponding consumable recognition system 360 according to the present invention. This embodiment substantially represents a reciprocal version of the sixth embodiment shown in FIG. 8. Again a light guide 113, e.g. an optical fiber, is placed on a surface (here the top 112) of the filtering body 111 of the consumable 110. In this embodiment light source elements 363 are positioned at locations 115 along the light guide 113. If at a location 115 the light guide 113 is modified (e.g. the cladding is removed) light 35 will be coupled into the light guide 113 from the respective light source element 363. The light transmitted through the light guide 113 can then be measured by a light sensor 362 (e.g. a photodiode) arranged at an outlet, e.g. at the end surface 114 of the light guide 113.

To enable (binary) coding the light source elements 363 are typically actuated sequentially in time and/or are transmitting (sequentially or simultaneously different light (e.g. light of different color or otherwise coded light).

In another implementation the length of the light guide provides the coding. Light is coupled in at one end of the light guide, e.g. at the end surface 104 as shown in FIG. 8, and light is only coupled out at the other end of the light guide, e.g. the opposite end surface, where the time, phase and/or intensity of the light is measured and compared to the emission of light into the light guide. Along the length of the (longest possible) light guide a number of light sensing elements are arranged which sense light if the light guide ends at their location, i.e. the different lengths of the light guides are used to distinguish the types of consumables. This enables Ns+1 coding possibilities.

In another embodiment multiple light guides (e.g. fibers) may be used that can guide light from one or more sources to one or more measurement spots. Also, in general, the amount of light transmission through the light guides may be varied to provide more coding possibilities. This can be done by varying e.g. fiber thickness. Furthermore, a (single) camera may be used instead of multiple photo diodes as light sensor. Depending on the particular design of the consumable and the consumable recognition system correct alignment of the consumable in the beverage dispenser may be required, which can e.g. be facilitated by having a lip or any other mechanical element supporting unambiguous placement of the consumable in the beverage dispenser.

It should also be noted that the design and arrangement of the light guide in the embodiments shown in FIGS. 8 and 9 may also be made differently. For instance, the light guide may also be arranged at a different surface of the consumable, such as the bottom wall or the side wall of the filtering body. The light guide may even be placed into a wall of the filtering body so that the light guide is to a large extent not visible and only the light input and exit locations are visible. The embodiments shown in FIGS. 8 and 9 have also been shown to be sufficiently robust to liquid contamination and slight variations in positioning of the light guide with respect to the light source(s) and light sensor(s).

Figure 10:
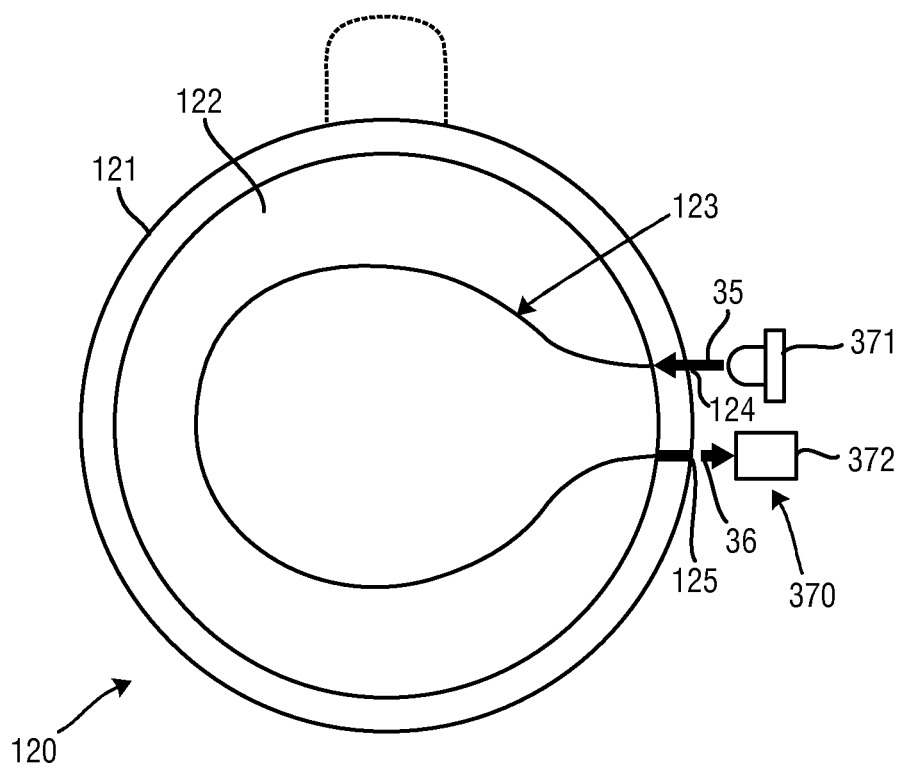
FIG. 10 shows a top view of an eighth embodiment of a consumable as well as a corresponding consumable recognition system according to the present invention.

FIG. 10 shows a top view of an eighth embodiment of a consumable 120 as well as a corresponding consumable recognition system 370 according to the present invention. In this embodiment, properties of the light guide itself are as an identifier. Again a light guide 123, e.g. an optical fiber, is placed on a surface (here the top 122) of the filtering body 121 of the consumable 120. Light 35 from a light source 371 is be coupled into the light guide 123 at one end 124, and light 36 coming out of the light guide at the other end 125 is detected by a light sensor 372. Alternatively, light reflected in the light guide 123 and coming out of the same end 124 as where light is coupled in may be measured.

By the above explained embodiments and further variations of the consumable recognition system and the corresponding consumables a simple, foolproof and easily implementable way of recognizing placement and/or type of consumable is enabled.

Properties of the light guide 123, like optical path length, attenuation, or its effect on polarization can be (indirectly) measured and serve as identifier for the recognition of the type of consumable. Optionally, the dependency of such properties on the wavelength of the light is detected as well. In that case multiple or multicolor LEDs and photo diodes may be used for light emission and light sensing. As a specific example in this context a fiber Bragg grating may be employed.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A consumable recognition system for recognizing placement and/or type of consumable containing a food substance for preparation of a beverage by use of a beverage dispenser, the consumable recognition system comprising:
    a consumable for use in the beverage dispenser for preparation of the beverage comprising a filtering body defining a space containing the food substance from which the beverage is obtained, the consumable comprising a reflection element for reflecting incident light in a predetermined way, wherein the predetermined way depends on a position, orientation, fluorescence, phosphorescence and/or polarization characteristic of said reflection element;
    a light source for emitting light to the consumable;
    a light sensor comprising a plurality of sensor elements for sensing light reflected from the reflection element of the consumable to obtain a sensor signal, wherein the sensor signal depends on the position, orientation, fluorescence, phosphorescence, and/or polarization characteristic of said reflection element; and
    a signal processor for recognizing the placement and/or type of the consumable based on said sensor signal, wherein: a number, a position and/or a sensed light intensity of the sensed light that is reflected from the reflection element depends on the position, orientation, fluorescence, phosphorescence and/or polarization characteristic of the reflection element, and wherein the sensor signal is formed based on the number, position, and/or the sensed light intensity of the plurality of sensor elements.

2. The consumable recognition system as claimed in claim 1, wherein said light source and/or said light sensor are arranged at a fixed position with respect to the consumable, and wherein said light source is configured to emit a light beam onto a predetermined spot or area of a predetermined surface of the consumable.

3. The consumable recognition system as claimed in claim 1, wherein said light source and said light sensor are arranged at a movable position with respect to the consumable, and wherein said light source is configured to emit a light beam so that the light beam sweeps over a predetermined area of a predetermined surface of the consumable.

4. The consumable recognition system as claimed in claim 1, wherein said light sensor is configured to sense intensity, color, direction of incidence, and/or polarization of light reflected from said reflection element.

5. A beverage dispenser for preparation of a beverage by use of a consumable containing a food substance, from which the beverage is obtained by use of extraction liquid, the beverage dispenser comprising:
    a consumable recognition system as claimed in claim 1 for recognizing placement and/or type of consumable,
    a chamber for receiving the consumable and for passage of the extraction liquid through the consumable,
    a liquid processing unit for the passage of the extraction liquid through the consumable, and
    a controller for controlling one or more parameters of the beverage dispenser according to the recognized placement and/or type of consumable.

6. A set of consumables comprising at least two consumables for use in a beverage dispenser for preparation of a beverage, each consumable of said set comprising:
    a filtering body defining a space containing a food substance, from which the beverage is obtained,
    a reflection element for reflecting incident light in a predetermined way, wherein the predetermined way depends on a position, orientation, fluorescence, phosphorescence and/or polarization characteristic of said reflection element, wherein said reflection element has a different position, orientation, fluorescence, phosphorescence and/or polarization characteristic for each type of consumable of the set of consumables, and wherein a number, a position, and/or a sensed light intensity of the incident light that is reflected from the reflection element depends on the position, orientation, fluorescence, phosphorescence, and/or polarization characteristic of the reflection element.

7. The set of consumables as claimed in claim 6, wherein the reflection element is a surface or part of a surface of the filtering body, in particular a rim, bottom surface, cover, or side wall or a part thereof, which has a predetermined inclination with respect to the incident light.

8. The set of consumables as claimed in claim 6, wherein the reflection element comprises one or more predetermined reflective spots and/or reflective areas of a predetermined surface of the filtering body.

9. The set of consumables as claimed in claim 6, wherein the reflection element comprises a fluorescent, phosphorescent, and/or polarization-affecting material.

* * * * *